Patented Oct. 31, 1950

2,527,853

UNITED STATES PATENT OFFICE 2,527,853

UNSATURATED ETHERS

John Robert Roach and Harold Wittcoff, Minneapolis, Minn., assignors to General Mills, Inc., a corporation of Delaware No Drawing. Application January 4, 1946, Serial No. 639,160

5 Claims. (Cl. 260—615)

The present invention relates to unsaturated ether derivatives of polyhydroxy condensation products of ketones with formaldehyde.

The products of the present invention possess highly desirable properties and are superior to materials heretofore available. The unsaturated ethers herein described may have varying degrees of unsaturation and may be polymerized to produce water-white, clear, highly transparent, infusible polymers, which polymers are extremely hard and extremely insoluble, and which demonstrate greater resistance to water, dilute acid, alkali, or various other chemicals, than do other polymers derived from unsaturated monomers containing ester groupings or other compounds which have been available heretofore. Furthermore, the polymers herein described, when cast into films, demonstrate unusual adherence to glass, wood, and metal, and are particularly adaptable to application in the field of protective coatings.

It is, therefore, a primary object of this invention to provide novel unsaturated ethers resulting from the etherification of polyhydroxy condensation products of ketones with formaldehyde. It is the further object of the invention to provide highly desirable polymeric compounds derived from the above mentioned unsaturated ethers.

The above objects and advantages of the invention will be more fully apparent from the following description of the invention. In general, the invention includes unsaturated ethers of varying degrees of substitution which may be derived from polyhydroxy condensation products of formaldehyde with a variety of ketones such as acetone, methyl ethyl ketone, diethyl ketone, mesityl oxide, levulinic acid, diacetyl, acetylacetone, acetonylacetone, acetophenone, cyclohexanone, cyclopentanone, etc. The production of the polyhydroxy condensation products is preferably carried out in accordance with the process disclosed in application Serial No. 599,947, filed June 16, 1945, now U. S. Patent 2,462,031, by Harold Wittcoff. In accordance with that application, products having varying degrees of hydroxylation may be produced by condensation of formaldehyde with a variety of aliphatic and alicyclic ketones. It is preferred, however, to employ at least one mole of formaldehyde for each atom of active hydrogen in the ketone. In general a slight excess of formaldehyde is used. Thus if the ketone contains six replaceable hydrogen atoms and a carbonyl capable of reduction it is desirable to use seven and one-half or eight molar equivalents of formaldehyde rather than the seven moles required theoretically. The reaction is preferably carried out at an elevated temperature in the presence of an alkaline catalyst. The polyhydroxy condensation product or products may, if desired, be isolated from the reaction mixture. Usually, however, it is preferred from an economic standpoint, to utilize the crude reaction mixture in the etherification mixture. The etherification is preferably accomplished by means of an unsaturated halide. In this etherification reaction the reaction mixture is preferably alkaline and accordingly there is no necessity of removing the alkalinity from the polyhydroxy reaction mixture. On the contrary, it is sufficient merely to concentrate the aqueous polyhydroxy solution and add solid alkali to it, while keeping the mixture cool until an approximately 50% aqueous alkali solution results. The advantages of this process are pointed out in detail in our copending application, Serial No. 639,158, entitled Etherification Process, filed of even date herewith.

The unsaturated halides employed in the etherification can be of a wide variety such as vinyl, allyl, methallyl, ethylallyl, cinnamyl, crotyl, chloroallyl, chlorocrotyl, propargyl, methylvinylcarbinyl, tiglyl, isopropenylvinylcarbinyl, divinylcarbinyl, 2,4-hexadiene-1-yl, 2-methyl-2-hexene-1-yl, 1-butene-4-yl, or any lower unsaturated halide having an unsaturated carbon to carbon linkage in an aliphatic chain not in excess of ten carbon atoms.

The etherification reaction is effected by causing these polyfunctional alcohols to react with an unsaturated halide in accordance with any procedure of etherification commonly known in the art. It has been found particularly advantageous, however, to employ as a condensing agent a strong alkaline solution such as 50% NaOH or a basic substance of similar nature. In general, the polyhydric alcohol and the base may be mixed, after which the halide may be added all at once or slowly with suitable agitation at a temperature of 70–110° C. although lower or higher temperatures may be used, depending on the halide which is used and on its reactivity. The order of addition likewise may be reversed with satisfactory results. Thus the halide and the polyhydric alcohol may be mixed after which the base is added slowly with stirring. After all the reagents are brought into contact, the reaction mixture may advantageously be heated at the desired temperature with stirring for a length of time varying from 1 to 4 hours although longer heating is not deleterious. After the etherification has been effected, the product together with some admixed halide forms an upper layer in the reaction vessel. It may be removed and washed to destroy alkalinity, after which the unreacted halide is readily recovered by distillation. More product may be recovered from the aqueous salt mixture which forms the bottom layer in the reaction vessel by extraction with a suitable solvent such as ether or benzene or other common organic solvents.

In general these etherification mixtures are heterogeneous and accordingly, efficient stirring means which promotes more intimate contact between the phases increases the speed of reaction. In some instances it is desirable to employ a suitable solvent in which the two phases are soluble, in order to promote the reaction.

In general it is desirable to use an excess of unsaturated halide, preferably about two equivalents, although lesser ratios may be employed, and an even larger excess of alkali, since such conditions tend to yield more complete etherification and at the same time the high concentration of alkali decreases the hydrolysis of the etherification reagent. By this one-step etherification process the degree of substitution in the polyhydric alcohol is approximately 75%, although this may vary according to the conditions employed and the reactivity of the halide, yielding products which are readily adaptable for polymerization purposes, for it is by no means necessary to use completely etherified materials in order to obtain highly desired polymers. If, however, completely etherified products are desired, the partially etherified material may be treated with a calculated amount of sodium at a temperature approximating the melting point of sodium. Of course, any similarly reactive metal may be used. Once the metallic derivative has formed, the reaction mixture is treated with more unsaturated halide to yield a fully etherified material.

In those instances where the etherifying agent is insufficiently reactive or is too volatile under the conditions described above, as for example allyl chloride, more drastic conditions may be employed, such as the use of elevated temperatures, in an autoclave if necessary. In certain cases it may be advisable to employ indirect means of etherification. For example, vinyl ethers may be obtained from the interaction of the polyhydric alcohol and acetylene in the presence of sodium hydroxide or a suitable catalyst.

It will be apparent that ethers of almost any degree of substitution can be prepared by suitable control over reaction conditions. The ethers which result are mixtures whose composition depends on that of the original polyhydric alcohol mixture. Since all the compounds formed are highly unsaturated and are readily polymerized, it is most practical to polymerize the mixture without separating it into its components. If, however, pure compounds are desired, these may be obtained with ease by the fractional distillation in vacuo of the unsaturated ether mixture.

The distilled ethers are clear liquids which are practically always colorless and which are miscible with a variety of organic solvents such as acetone, alcohol, chloroform, dioxane, benzene, xylene, ethers of various types, paraffin hydrocarbons, etc.

The polymerizability of a compound depends to a large extent upon the functionality of the unsaturated monomer. This is proportional to the degree of unsaturation, which can be measured readily by determining the iodine number.

These monomers may be used for a multiplicity of purposes such as solvents for various polymers, paint, varnish, enamel, lacquer, and other protective coating compositions, or plasticizers for various cellulose derivatives and other types of derivatives. In particular, however, the products are found to polymerize to yield highly desirable polymers either spontaneously or in the presence of such catalysts as heat, light, ultra-violet radiation, oxygen, ozone, peroxides such as benzoyl or lauryl peroxide, and metallic driers such as Pb, Co, Mn, Ni, Fe, etc. which are generally used in the form of their fat-soluble salts such as stearates or naphthenates, in order to accelerate the polymerization of protective coating films.

The products of polymerization vary somewhat in physical properties, depending on the molecular structure of the monomer employed, on the extent of polymerization, and on the method used to effect it. The polymers, however, are nearly always clear and transparent and are substantially insoluble and infusible when completely polymerized. It will be apparent that intermediate polymers with a great variety of properties may be secured.

Two principal types of products can be obtained by the polymerization of these unsaturated ethers; one, a viscous polymer which has been polymerized to a degree short of gelation; and the second, a polymer which is a solid somewhat thermoplastic material which may be molded to a hard infusible polymer by the usual procedures.

The first type of product, that is the viscous polymer, may be incorporated into suitable compositions in order to obtain excellent protective coatings such as varnishes, enamels, and lacquers. Thus, whereas the ordinary protective coating is susceptible to the corrosive or deleterious effects of heat, acid, alkali, or other chemicals, these new compounds are extremely resistant to such agents. The preparation of these protective coatings may be accomplished by incorporation of the fusible and soluble polymer with the substances ordinarily employed in the protective coating industry. Pigmentation may be effected by the use of inorganic pigments such as zinc oxide, titanium oxide, etc. or by the use of organic dyes. Furthermore, useful products may be obtained by impregnation on inert substances such as bran, oat hulls, alpha-cellulose, leather, paper, wood, or other comparatively porous substances with the fusible polymer or a mixture containing it, along with a metallic drier or a peroxide such as benzoyl peroxide, after which the product may be cured or molded under heat and pressure to form an object which has good physical properties.

Upon the initial polymerization of the monomeric unsaturated ethers or solutions of these in suitable solvents by means of heating and exposure to air or oxygen or other similar device, a marked increase in viscosity is noted due to the formation of a polymer which has good solubility characteristics. With the products under discussion the viscosity may increase up to 100 to 300 centistokes at 98° C. without danger of gelation, depending upon the particular unsaturated ether involved. Still further polymerization causes the liquid to set to a soft gel which contains a substantial portion of a polymer which is insoluble in the monomer and in organic solvents and which ordinarily contains soluble material which is a mixture of monomer and soluble fusible polymer. These gels are soft and fragile and tear and crumble on application of stress. They may be further polymerized, then, to the final infusible, insoluble state in which all of the polymer is substantially infusible and insoluble in organic solvents, acids, and alkalies.

When the polymerization is stopped short of gelation, the efficacy of the transparent, highly viscous, colorless material in protective coatings may be judged by casting a film of the product on glass, wood, or metal panels. In general this is best accomplished by dissolving the material in chloroform or some other suitable solvent. If desired a metallic drier such as Pb, Co, Mn, etc. in the form of the naphthenate or stearate, etc. or a peroxide such as benzoyl peroxide may be added. This, however, is by no means necessary, although in the absence of a polymerization catalyst it is necessary to bake the film at a temperature of 70° C. or slightly higher in order to obtain a hard film in a reasonable length of time. The solution is then cast into a film on glass and where metallic drier is present, a few hours at room temperature is sufficient to cause the formation of a smooth, clear, transparent coating which for all practical purposes is entirely insoluble and infusible and which is extremely hard. It adheres with marked tenacity to glass, wood, and metal, and is amazingly resistant to alkali, acid, water, other chemicals, and heat.

In order to prevent the highly viscous, fusible polymer from polymerizing still further to form a gel, the polymerization must be interrupted. This may be effected by cooling with the addition of a suitable solvent, in which the partially polymerized polymer is very stable. Further polymerization, until so desired, may be prevented also by the addition of an inhibitor such as pyrogallol. It is this partially polymerized, highly viscous liquid which may be incorporated into lacquer, enamel, and varnish and other protective coating compositions in order to yield highly resistant films. Of course, heat may be employed in order to accelerate the formation of the insoluble, infusible and resistant film.

The time of polymerization of the highly viscous liquid to an infusible and insoluble film is, of course, largely a function of the temperature. At temperatures between 70–100° C., however, the time desired is extremely short which makes these products particularly desirable in protective coatings which are baked or heat cured.

For the preparation of molding compositions various procedures may be followed. Thus the compounds themselves may be cast polymerized to form products having various shapes. These polymers in their finally cured state are substantially infusible and insoluble, and in general, demonstrate excellent wear-resistance and durability.

Likewise, as indicated above, an intermediate state of polymerization may be attained in which the product is soluble in such organic solvents as acetone, carbon tetrachloride, chloroform, benzene, etc. In this state of polymerization, the products are truly thermoplastic and may be polymerized further to an infusible state to yield products similar to those mentioned in the preceding paragraph. That is, the fusible polymer may be molded or otherwise shaped and polymerized by means of heat to form highly resistant and permanently shaped products.

The fusible polymer, likewise, may be subjected to still another procedure which is highly advantageous, and which involves removing a portion or all of the monomer and recovering the fusible polymer substantially free from monomer or at least containing much less monomer than is normally present in the monomer-polymer mixture referred to herein as the fusible polymer. The fusible polymer, from which the monomer has been removed, may then be extruded, molded, shaped or otherwise worked into desirable forms, and after final shaping, the products may be cured or completely hardened and rendered infusible by any of the suitable methods involving heat, and/or catalysts.

The fractionation of the highly viscous liquid— that is, the removal of the monomer may be effected by various procedures. In one convenient method, the monomer may be distilled from the polymer under conditions such as a high vacuum, reasonably low temperature, and the presence of inhibitors which tend to minimize further polymerization. Also, the monomer may be extracted with a solvent in which the polymer is insoluble such as petroleum ether. Correspondingly, the mixture may be dissolved in a suitable solvent such as chloroform, after which the fusible polymer is precipitated by addition of a non-solvent for the polymer such as petroleum ether. The fusible polymers so produced are characteristically thermoplastic, soluble in such solvents as chloroform, benzene, acetone, dioxane, etc. and soften or flow on heating. They are precipitated as white amorphous powders or as plastic semi-liquid resins from solutions by use of non-solvents.

It should be mentioned that a partially fusible polymer may be obtained from the gelled polymer simply by treating the gel with a solvent such as methyl or ethyl alcohol. Thus the monomer and soluble polymer present is dissolved, and the gel swells considerably. Thereafter it may be dried and powdered to yield a fusible polymer which can be cured according to the procedures indicated above.

A large number of inert substances may be incorporated with the fusible polymer before subjecting it to the molding condition. These may include plasticizers, softening agents, fillers, natural or synthetic resins, pigments, and organic dyestuffs.

Example 1

In an appropriate vessel equipped with agitator and reflux condenser were placed 392 parts of cyclohexanone, 660 parts of formaldehyde in the form of paraformaldehyde, 3500 parts of water, and 112 parts of calcium oxide. With stirring the temperature of the solution rose spontaneously to 55° C., whereupon the exothermic nature of the reaction was checked by external cooling. Thereafter, the reaction mixture was heated and stirred at 50–55° C. for two hours. The reaction mixture, after having been acidified to Congo Red paper with dilute sulfuric acid, was filtered and desolvated to yield a sirup which crystallized readily on trituration with alcohol. Crystallization from absolute alcohol yielded 2,2,6,6-tetramethylolcyclohexanol with a melting point of 130–131° C. In the preparation of the allyl ether 55 parts of 2,2,6,6-tetramethylolcyclohexanol was dispersed in 168 parts of 50% aqueous sodium hydroxide at room temperature. Upon raising the temperature to approximately 72° C. the reaction mixture changed to a thick gel which was difficult to stir. However, upon the dropwise addition of 240 parts of allyl bromide the mixture gradually became more stirrable until at the end of the addition of allyl bromide, which required approximately four hours, the reaction mixture consisted of an oily layer comprised of the desired allyl ether of 2,2,6,6-tetramethylolcyclohexanol and excess allyl bromide and the lower aqueous alkaline layer which contained crystalline sodium bromide. Following the addition of allyl bromide, the well stirred mixture was heated for two hours in a bath at 75–80° C. after which time the mixture was cooled and the oily layer of desired allyl derivative was extracted with ethyl ether. The extract was washed with slightly acidified water, followed by repeated washings with water, was dried over anhydrous sodium sulfate and was distilled after desolvation in vacuo in a carbon dioxide atmosphere. The product distilled at 167–180° C. at 1.3 mm. and possessed an iodine number of 226.

*Example 2*

Fifty-five parts of 2,2,6,6-tetramethylolcyclohexanol was dispersed in 240 parts of allyl bromide and the mixture was heated to the reflux temperature in a bath at 75–80° C. This formed a fluid dispersion which remained easily stirrable throughout the reaction period and to which was added dropwise 168 parts of 50% aqueous sodium hydroxide over a 4-hour period during which the mixture was maintained at its reflux temperature. At the end of the addition of alkali the mixture was heated for another two hours and then the product was isolated as disclosed in Example 1. The product distilled chiefly at 195–198° C. at 9 mm. and possessed an iodine number of 242.

*Example 3*

250 parts of a polyhydroxy alcohol obtained by the condensation of formaldehyde and methyl ethyl ketone, possessing a hydroxyl content of approximately 30% was carefully dissolved or dispersed in 840 parts of 50% aqueous sodium hydroxide with stirring and with cooling. After the mixture was uniform it was heated to 70–75° C. and 1200 parts of allyl bromide was added dropwise over a period of six hours, after which it was heated for two more hours. The mixture was cooled and the allylated product was isolated by ethyl ether extraction, followed by fractionation in vacuo in an inert atmosphere. Approximately 10% of the mixture distilled at 95–100° C. at 2 mm. and had an iodine number of 240.7, whereas approximately 70% distilled at 158–168° C. at 2 mm. and had an iodine number of 272.3. The remainder of approximately 20% was a real viscous, but soluble, non-distillable residue with an iodine number of 161.5.

*Example 4*

100 parts of the polyhydric alcohol described in Example 3 was mixed with 336 parts of 50% aqueous sodium hydroxide and the mixture was reacted with 480 parts of allyl bromide as disclosed in Example 3. The ethyl ether extract was then subjected to an ordinary distillation without attempting a fractionation and the allyl ether mixture thus obtained possessed an iodine number of 261.3 and upon partial polymerization followed by preparation of films gave water-white, clear, and unusually hard coatings.

*Example 5*

In order to effect complete allylation of the ether in Example 4, 180 parts of this distilled but unfractionated allyl ether mixture was treated with 14 parts of metallic sodium. The allyl ether mixture was heated to approximately 105° C. and the metallic sodium was added in small pieces over a 2.5 hour period with vigorous agitation, after which the reaction was continued for three more hours. The mixture was then cooled to 80–85° C. and 80 parts of allyl bromide was added dropwise over a 30-minute period, during which time it was necessary to cool the reaction mixture. Following the addition, the reaction mixture was heated at 80–85° C. for two hours and then cooled and the excess sodium decomposed with ethyl alcohol and the fully allylated mixture extracted with ether, washed, and fractionated in vacuo in an atmposhere of carbon dioxide. Two compounds were obtained, the first boiling at 81° C. at 1.3 mm., $n_d^{25°}=1.4517$, iodine number of 271.5 and the main compound which had a boiling point of 150° C. at 1.3 mm., $n_d^{25°}=1.4683$, and iodine number of 294.8.

*Example 6*

300 parts of a polyhydroxy condensation product of formaldehyde and acetone having a hydroxyl value of 30.2% was etherified with 1280 parts of allyl bromide and 928 parts of 50% aqueous sodium hydroxide and the allyl ether mixture obtained according to the procedure followed in Example 1. The distilled but unfractionated product possessed an iodine number of 276.7 and upon polymerization gave clear, water-white films with excellent appearance and good physical properties. Two hundred and four parts of this partially allylated mixture was then reacted with 31 parts of metallic sodium and subsequently with allyl bromide according to the procedure disclosed in Example 5. By careful fractionation a small amount of a low boiling fraction was obtained, boiling point 110–120° C. at 2 mm., $n_d^{25°}=1.4618$, and iodine number of 313, and the main fraction which had a boiling point of 175° C. at 2.8 mm. $n_d^{25°}=1.4733$ and iodine number of 312. Both fractions upon polymerization gave films possessing excellent properties.

*Example 7*

A polyhydroxy condensation product of formaldehyde and diethyl ketone having a hydroxyl content of 30% was esterified by mixing 200 parts of it with 670 parts of 50% aqueous sodium hydroxide with the subsequent addition of 960 parts of allyl bromide according to the procedure disclosed in Example 1. The partially allylated ether was then extracted with ether and distilled, yielding a product which distilled at 74–160° C. at 1 mm. and which had an idone number of 223.4. This partially allylated material (175 parts) was reacted with 18.4 parts of sodium and subsequently with 117 parts of allyl bromide according to the procedure disclosed in Example 5. Upon fractional disillation in vacuo two fractions were obtained, the forerun which had a boiling point range of 105 to 128° C. at 1 mm. and the main product of the reaction which had a boiling point of 132–133° C. at 1 mm., $n_d^{25°}=1.4638$ and iodine number of 265.6. Polymerization of both fractions, as well as the unfractionated mixture gave films possessing excellent properties.

*Example 8*

A coating composition can be prepared by the partial polymerization of any of the allylated compounds or mixtures thereof disclosed in this application. For example, the partially allylated ether of the formaldehyde-ethyl methyl ketone condensation product prepared in Example 4 was polymerized to a viscosity of approximately 200 centistokes at 98° C. in 260 minutes by passing oxygen through the mixture at a rate of 6.8 liters/hr. at a temperature of 98° C. This gave a viscous, clear, water-white polymer which was still soluble in most organic solvents, and hence was dissolved in chloroform for the preparation of films. Films were cast from this solution and upon drying for several hours at 80° C. gave water-white perfectly clear films, possessing excellent properties. When baked at a higher temperature, for example 130° C., the polymerization time was appreciably decreased to give an equally excellent film. Films were also prepared from this solution containing small amounts of metallic drier, such as cobalt and manganese naphthenates. These films dried in a few hours at room temperature. Benzoyl peroxide was added to the solution (approximately 1% based on the weight of the resin) and the resulting film baked at 80° C. for several hours to produce an equally clear and water-white film.

While this example has been given merely to indicate a specific form of practice, the preparation of a highly polymeric substance from the various unsaturated ethers which have been disclosed is not limited to this method of polymerization. Other means of polymerization are by oxygen in the presence of metallic driers such as cobalt naphthenate, manganese naphthenate, etc., at an elevated temperature, by air at an elevated temperature both in the absence and presence of metallic driers, and by peroxides in the absence of air or by oxygen at an elevated temperature.

While various modifications of the invention have been described, it will be apparent that other variations are possible without departing from the spirit of the invention as pointed out in the appended claims.

We claim as our invention:

1. An unsaturated ether of a polyhydroxy condensation product containing five hydroxyl groups and resulting from the condensation of a ketone selected from the group consisting of acetone and cyclohexanone, with at least one mole of formaldehyde per atom of active hydrogen in the ketone, the unsaturated ether group containing an unsaturated carbon to carbon bond in an aliphatic chain not exceeding six carbon atoms in length.

2. An unsaturated ether of 2,2,6,6-tetramethylolcyclohexanol, the unsaturated ether group containing an unsaturated carbon to carbon bond in an aliphatic chain not exceeding six carbon atoms in length.

3. An allyl ether of 2,2,6,6-tetramethylolcyclohexanol.

4. An unsaturated ether of a polyhydroxy condensation product having five hydroxyl groups and resulting from the condensation of acetone with at least one mole of formaldehyde per atom of active hydrogen in the acetone, the unsaturated ether group containing an unsaturated carbon to carbon bond in an aliphatic chain not exceeding six carbon atoms in length.

5. An allyl ether of a polyhydroxy condensation product having five hydroxyl groups and resulting from the condensation of acetone and at least one mole of formaldehyde per atom of active hydrogen in the acetone.

JOHN ROBERT ROACH.
HAROLD WITTCOFF.

REFERENCES CITED

The following references are of record in the file of this patent:

UNITED STATES PATENTS

| Number | Name | Date |
| --- | --- | --- |
| 1,774,500 | Burke | Sept. 2, 1930 |
| 2,157,347 | Reppe et al. | May 9, 1939 |
| 2,165,962 | Mueller-Cunradi | July 11, 1939 |
| 2,201,074 | Britton et al. | May 14, 1940 |
| 2,318,959 | Muskat et al. | May 11, 1943 |
| 2,382,640 | Kenyon | Aug. 14, 1945 |

OTHER REFERENCES

Nichols et al., "Official Digest," March 1945, pages 111, 117, 118, 119, 121, 122.

Ellis, Chemistry of Synthetic Resins, vol. 1, pages 543–549, published by Reinhold, N. Y., 1935.

Walker, "Formaldehyde," pages 155–160, published by Reinhold, N. Y., 1944.